Patented Mar. 5, 1946

2,395,812

UNITED STATES PATENT OFFICE 2,395,812

POLYMERS OF 1-CARBALKOXYBUTADI-ENES-1,3 AND PROCESS OF MAKING SAME

Herbert Gudgeon and Rowland Hill, Blackley, Manchester, England, assignors to Imperial Chemical Industries Limited, a corporation of Great Britain No Drawing. Application February 28, 1940, Serial No. 321,354. In Great Britain February 28, 1939

8 Claims. (Cl. 260—92.6)

The present invention relates to the manufacture of polymerisation products.

An object of the present invention is to provide valuable polymerisation products. A further object is to provide useful ingredients for coating compositions. Other objects of the invention will be apparent from the following description.

These objects may be accomplished in accordance with the present invention whereby we manufacture polymerisation products by subjecting an aqueous emulsion or dispersion of a monomeric ester of 1-carboxy-butadiene-1:3 to the polymerising action of heat and/or a polymerisation catalyst.

Esters which may be used as starting materials are, for example, 1-carbomethoxy-, 1-carboethoxy-, or 1-carbobutoxy-butadiene-1:3 (see copending application Serial No. 310,471, filed Dec. 21, 1939, now U. S. Patent No. 2,232,944, patented February 25, 1941).

We may polymerise an emulsion of a single monomeric ester of 1-carboxybutadiene-1:3 or we may use an emulsified mixture of such esters.

Useful polymerisation catalysts are those, for example, of the kind referred to in British Specification 15,271 of 1914.

Polymerisation may be carried out in either an open or a closed vessel and, if desired, at pressures above atmospheric pressure and may be effected by heating, for example, to temperatures from 35° C. to 90° C.

In general the fineness of division and stability of the original emulsions or dispersions of the monomeric esters largely determines the state of division of the resulting polymerisation products. Thus, for example, the relatively coarse emulsions or dispersions obtained by vigorous stirring of the monomeric esters with water will yield more lumpy or granular polymerisation products than those from finer emulsions such as those prepared by injecting a fine spray of monomer into water which is vigorously stirred or shaken, particularly if, in the latter case, the water also contains a wetting agent such as an alkyl-naphthalene sulphonate. Where it is desired to obtain a very finely divided product and particularly where it is desired to have the resulting polymerisation product in the form of a stable, latex-like emulsion, it is preferred to use an emulsifying agent in the preparation of the original monomer emulsions. Useful emulsifying agents for this purpose are, for example, inorganic acid esters of high molecular weight aliphatic alcohols, such as cetyl sodium sulphate; soap-like emulsifiers, such as sodium or ammonium oleate; and quaternary ammonium or phosphonium or ternary sulphonium salts containing high molecular weight aliphatic hydrocarbon radicals. As examples of quaternary ammonium salts of the kind referred to may be mentioned, cetyl pyridinium bromide and cetyl-p-dimethyl-aminobenzoate methosulphate. Again, per-salts such as ammonium persulphate, which like hydrogen peroxide, function as polymerisation catalysts, can also be used as emulsifying agents for the production of the aqueous emulsions of monomers. There may also be employed as emulsifying agents high molecular polymeric compounds yielding viscous aqueous solutions such as, for example, gum tragacanth, water-soluble starches, water-soluble methyl celluloses, polyvinyl alcohol, partly saponified water-soluble polyvinyl esters, polyacrylic and polymethacrylic acids (preferably in the form of their water-soluble alkali salts), and interpolymers which are derived from acrylic or methacrylic acid and other polymerisable compounds, e. g. an acrylic ester or a methacrylic ester, and form water-soluble alkali salts.

The course of polymerisation may be conveniently controlled by the addition of small amounts of electrolytes having an acid or alkaline reaction as for example acetic acid and sodium carbonate, the choice of electrolyte depending on the nature of the emulsifying or dispersing agent employed. Agents possessing a buffering action, for example, sodium acetate, may also be used.

As has been indicated, according to the procedure adopted the polymerisation products may be obtained in the form of latex-like emulsions or dispersions, or finely divided, granular or lumpy masses. Where a latex-like emulsion or dispersion is obtained, the polymerisation product can, if desired, be isolated in a more concentrated solid form by breaking down the emulsion or flocculating the dispersion. This may be done, for example, by the addition of electrolytes, e. g. sodium chloride or by the addition of a water-miscible liquid in which the polymerisation product is substantially insoluble, such as methyl alcohol.

If it is desired to have coloured interpolymerisation products or to introduce plasticisers or inert fillers, the requisite colouring matters, plasticizers or fillers may be incorporated in the emulsion to be polymerised or they may be incorporated after polymerisation.

The polymerisation products manufactured according to the invention range from pale-coloured, soft balsam-like solids to pale-coloured, tough, elastic solids according to the monomeric ester used as starting material. They are soluble in solvents such as toluene, carbon tetrachloride, acetone, butyl acetate, and beta-ethoxy-ethyl alcohol.

The polymerisation products are useful ingredients in coating compositions.

In the case of latex-like emulsions or dispersions the polymerisation products may be caused to form transparent films or coatings on objects by applying the emulsions or dispersions to the objects and allowing the water to evaporate. In this manner, by applying such emulsions or dispersions to textile fibres, it is possible to modify the appearance, feel and texture thereof.

The following examples, in which the parts are by weight, illustrate but do not limit the invention.

*Example 1*

100 parts of 1-carbomethoxybutadiene-1:3 (B.P. 54°/24 m. m.) are emulsified in 400 parts of water containing 8 parts of cetyl sodium sulphate, 0.95 part of glacial acetic acid and 0.02 part of sodium acetate. The emulsion is stirred for 6 hours at 60° C. by which time polymerisation is complete. To the resulting emulsion or dispersion of polymerisation product there is added an approximately equal bulk of methyl alcohol whereupon the polymer precipitates as an elastic coagulum and may be separated by decantation. By washing and drying the coagulum on a rubber roller mill the polymer is obtained in the form of a tough, elastic sheet. The product is soluble in for example, toluene, carbon tetrachloride, acetone, butyl acetate, and beta-ethoxy-ethyl alcohol.

*Example 2*

20 parts of 1-carbobutoxybutadiene-1:3 (made according to co-pending application 37,506/38) are emulsified in 200 parts of water containing 4 parts of cetyl sodium sulphate, 0.5 part of glacial acetic acid and 0.1 part of sodium acetate. The emulsion is then stirred for 18 hours at 60° C. by which time polymerisation is complete. The polymerisation product may be isolated from the resulting aqueous emulsion or dispersion by the addition of methyl alcohol as described in Example 1. The coagulum so obtained is a soft, balsam-like mass soluble in toluene, carbon tetrachloride, acetone, butyl acetate and beta-ethoxy-ethyl alcohol.

*Example 3*

200 parts of 1-carbomethoxybutadiene-1:3 are added, conveniently with 10 parts of hydrogen peroxide (20 vols.) at 75° C., during 1 hour to 360 parts of water containing 0.9 part of cetyl sodium sulphate, 15 parts of the sodium salt of an interpolymer of methacrylic acid with methyl methacrylate and 3.5 parts of sodium carbonate. The whole is then vigorously agitated for 17 hours, after which time polymerisation is substantially complete.

The resulting dispersion is free from coagulated polymer. It shows no tendency to separate into phases after keeping for several months. If the dispersion is applied to a surface and allowed to dry, the polymer remains after evaporation of the water as a colourless tough transparent elastic coating.

*Example 4*

100 parts of 1-carbomethoxybutadiene-1:3 containing 0.2 part of benzoyl peroxide are stirred with 200 parts of water containing 1 part of cetyl sodium sulphate and 0.5 part of glacial acetic acid. The resulting emulsion is then stirred at 50° C. until polymerisation is complete. The polymer can be isolated by the method described in Example 1.

In place of benzoyl peroxide, ammonium persulphate may be equally advantageously employed.

*Example 5*

200 parts of 1-carbomethoxybutadiene-1:3 are stirred with 800 parts of water containing 16 parts of cetyl trimethylammonium bromide, 2 parts of glacial acetic acid and 2 parts of ammonium persulphate. The resulting emulsion or dispersion is stirred at 60° C. for 3 hours. The polymer is then coagulated by the addition of 600 parts of methanol and 20 parts of sodium chloride. The rubbery coagulum is kneaded with warm water and dried.

*Example 6*

200 parts of 1-carboethoxybutadiene-1:3 are rapidly stirred into 400 parts of water containing 2.5 parts of ammonium persulphate. The resulting emulsion is stirred at 60° C. for 22 hours. Towards the termination of polymerisation, a portion of the polymer separates as a soft elastic clot. The remainder of the polymer is recovered from the emulsion by the addition of small quantities of ethanol and saturated sodium chloride solution alternately until coagulation is complete. The polymer is washed with warm water and dried. It forms a pale straw-coloured soft elastic mass.

*Example 7*

200 parts of 1-carbomethoxybutadiene-1:3 and 200 parts of 1-carboethoxybutadiene-1:3 are mixed together and rapidly stirred into 600 parts of water containing 12 parts of sodium oleate. The resulting emulsion is heated at 60° C. with agitation. The mixed polymer slowly separates as a soft elastic mass. When separation has ceased, steam is blown through the mass to remove a small amount of unpolymerised material. The resulting product is pale straw-coloured, soft and elastic.

As many apparently widely different embodiments of this invention may be made without departing from the spirit and scope thereof, it is to be understood that we do not limit ourselves to the specific embodiments except as defined in the appended claims.

We claim:

1. Process which comprises polymerizing, in aqueous emulsion, an alkyl ester of 1-carboxybutadiene-1,3 in which the alkyl group contains from 1 to 4 carbon atoms.
2. Process which comprises polymerizing, in aqueous emulsion, an alkyl ester of 1-carboxybutadiene-1,3 in which the alkyl group contains from 1 to 4 carbon atoms, by the action of heat.
3. Process which comprises polymerizing, in aqueous emulsion, an alkyl ester of 1-carboxybutadiene-1,3 in which the alkyl group contains from 1 to 4 carbon atoms, in the presence of a polymerization catalyst.
4. Process which comprises polymerizing, in aqueous emulsion, 1-carbomethoxybutadiene-1,3.
5. Process which comprises polymerizing, in aqueous emulsion, 1-carbomethoxybutadiene-1,3 by the action of heat.
6. Process which comprises polymerizing, in aqueous emulsion, 1-carbomethoxybutadiene-1,3 in the presence of a polymerization catalyst.
7. A product made by the process of claim 1.
8. A product made by the process of claim 4.

HERBERT GUDGEON.
ROWLAND HILL.